(12) United States Patent
Peterson et al.

(10) Patent No.: US 11,420,319 B2
(45) Date of Patent: Aug. 23, 2022

(54) PLATFORM EXTENSION MECHANISM

(71) Applicant: Robert Bosch GmbH, Stuttgart (DE)

(72) Inventors: Corday Peterson, Fountain, MN (US); Corey Schlichter, Faribault, MN (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 274 days.

(21) Appl. No.: 16/844,122

(22) Filed: Apr. 9, 2020

(65) Prior Publication Data

US 2021/0316440 A1 Oct. 14, 2021

(51) Int. Cl.
*B23Q 3/00* (2006.01)
*B25H 1/14* (2006.01)
(Continued)

(52) U.S. Cl.
CPC ........... *B25H 1/14* (2013.01); *F16M 11/2092* (2013.01); *B62B 3/02* (2013.01); *B62B 3/022* (2013.01); *F16M 11/38* (2013.01); *F16M 11/42* (2013.01)

(58) Field of Classification Search
CPC ...... B25H 1/14; F16M 11/2092; F16M 11/38; F16M 11/42
(Continued)

(56) References Cited

U.S. PATENT DOCUMENTS 4,630,741 A * 12/1986 Stevens .............. A01M 7/0071
  212/203
5,026,176 A *  6/1991 Jensen .................... B60R 11/06
  188/67

(Continued)

FOREIGN PATENT DOCUMENTS

DE  3245608    8/1983
JP  H11171488  6/1999

OTHER PUBLICATIONS

"GE-52200", 1 page—https://gmtoolsandequipment.com/en-US/Pages/ItemDetail.aspx?SKU=GE-52200.
(Continued)

*Primary Examiner* — Joseph J Hail
*Assistant Examiner* — Shantese L McDonald
(74) *Attorney, Agent, or Firm* — Kathy Takeguchi (57) ABSTRACT

A platform extension mechanism includes at least a bumper, a rolling bearing, an adjuster, and an axle. The axle has a first end surface and a second end surface. The axle is elongated along a first axis. The axle includes interior wall portions that define a slot from the first end surface to the second end surface. The axle is structured to receive the bumper and the adjuster via the slot. The axle is structured to support the bumper and the adjuster in relation to a platform and a structural channel. The axle includes a mounting portion and a shaft portion. The mounting portion has a flange with a first side and a second side. The first side of the flange is mountable to a sidewall portion of the platform. The shaft portion protrudes outward from the second side of the flange. The shaft portion has a peripheral portion that is structured to support the rolling bearing at a designated location along the first axis and enable the rolling bearing to move along the structural channel. The shaft portion is structured to support the bumper and the rolling bearing in a coaxial arrangement. The adjuster is aligned with the bumper and configured to adjust a position of the bumper along the first axis of the axle.

20 Claims, 6 Drawing Sheets

(51) Int. Cl.
  *F16M 11/20* (2006.01)
  *B62B 3/02* (2006.01)
  *F16M 11/38* (2006.01)
  *F16M 11/42* (2006.01)

(58) Field of Classification Search
  USPC .............................. 269/289 R, 292, 293, 294
  See application file for complete search history.

(56) References Cited

U.S. PATENT DOCUMENTS

| | | | | |
|---|---|---|---|---|
| 6,508,281 | B1 * | 1/2003 | Wang | B23D 47/025 |
| | | | | 144/287 |
| 10,544,019 | B2 | 1/2020 | Kochie et al. | |
| 2011/0057374 | A1 * | 3/2011 | Liu | B23D 47/025 |
| | | | | 108/50.11 |

OTHER PUBLICATIONS

"PowerTrain Lift (SKU 5295)," 2 pages—https://www.otctools.com/products/powertrain-lift.
"Ford 3kLIFTTABLE," 1 page—https://rotunda.service-solutions.com/en-US/Pages/ItemDetail.aspx?SKU=014-3KLIFTTABLE.
PCT International Search Report for PCT/EP2021/657758.

* cited by examiner

PLATFORM EXTENSION MECHANISM

FIELD

This disclosure relates generally to platform extension mechanisms.

BACKGROUND

Some propulsion lifts include platforms, which are extendible. This feature is advantageous in various tasks, such as the separation of automotive powertrain components. However, when adjusting an extension amount, such a platform may experience a substantial amount of backlash that results in side-to-side movements of the platform. This horizontal backlash may be problematic or may present a safety hazard, as such a platform is unstable and difficult to handle. In some cases, trial-and-error adjustments are made to cams at the underside of the platform to take out the side-to-side play in the components of the platform. However, such adjustments are tedious and involve being positioned inconveniently under the platform itself.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a platform extension mechanism is configured for at least a platform with a structural channel. The platform extension mechanism includes a bumper, a rolling bearing, and an axle. The axle has a first end surface and a second end surface. The axle is elongated along a first axis. The axle includes interior wall portions that define a slot from the first end surface to the second end surface. The axle is structured to receive the bumper in the slot and support the bumper in relation to the platform and the structural channel. The axle includes a mounting portion and a shaft portion. The mounting portion includes a flange with a first side and a second side. The first side of the flange is mountable to an inner side of a sidewall portion of the platform. The shaft portion protrudes outward from the second side of the flange. The shaft portion has a peripheral portion that is structured to support the rolling bearing at a designated location along the first axis and enable the rolling bearing to move along the structural channel. The shaft portion is structured to support the bumper and the rolling bearing in a coaxial arrangement.

According to at least one aspect, a platform assembly includes at least a platform, a frame, a structural channel, and a platform extension mechanism. The platform includes at least a work surface portion and a sidewall portion. The frame is configured to support the work surface portion and the sidewall portion. The structural channel is mounted on the frame. The platform extension mechanism includes a bumper, a rolling bearing, and an axle. The bumper is configured to confront a surface of the structural channel. The rolling bearing is configured to move along the structural channel. The axle has a first end surface and a second end surface. The axle is elongated along a first axis. The axle includes interior wall portions that define a slot from the first end surface to the second end surface. The axle is structured to receive the bumper in the slot and support the bumper in relation to the platform and the structural channel. The axle includes a mounting portion and a shaft portion. The mounting portion includes a flange with a first side and a second side. The first side of the flange is mountable to the sidewall portion of the platform. The shaft portion protrudes outward from the second side of the flange. The shaft portion has a peripheral portion, which is structured to support the rolling bearing at a designated location along the first axis and enable the rolling bearing to move along the structural channel. The shaft portion is structured to support the bumper and the rolling bearing in a coaxial arrangement.

According to at least one aspect, a platform assembly includes a platform, a frame, a structural channel, and a platform extension mechanism. The platform includes at least a work surface portion and a sidewall portion. The frame is configured to support the work surface portion and the sidewall portion. The structural channel is mounted on the frame. The platform extension mechanism includes at least a bumper, an adjuster, and an axle. The bumper is configured to confront a surface of the structural channel. The adjuster is configured to adjust a position of the bumper. The axle has a first end surface and a second end surface. The axle is elongated along a first axis. The axle includes interior wall portions that define a slot from the first end surface to the second end surface. The axle includes a mounting portion and a shaft portion. The mounting portion includes a flange having a first side and a second side. The first side of the flange is mountable to the sidewall portion of the platform. The shaft portion protrudes outward from the second side of the flange. The shaft portion is configured to support the bumper via the interior wall portions such that the bumper protrudes outward from the second end surface of the axle.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1A:
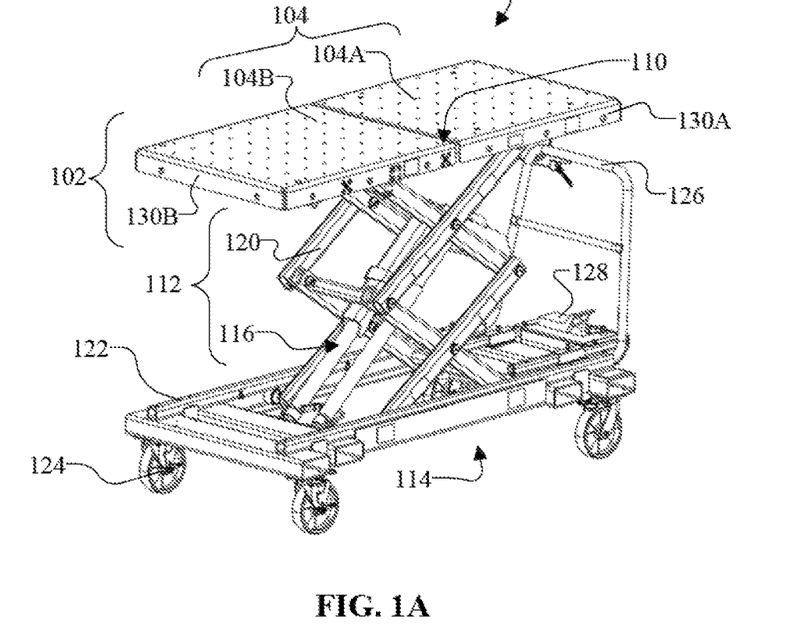
FIG. 1A is a perspective view of an example of a lift apparatus with a platform extension mechanism in which the platform is in a first state according to an example embodiment of this disclosure.
Figure 1B:
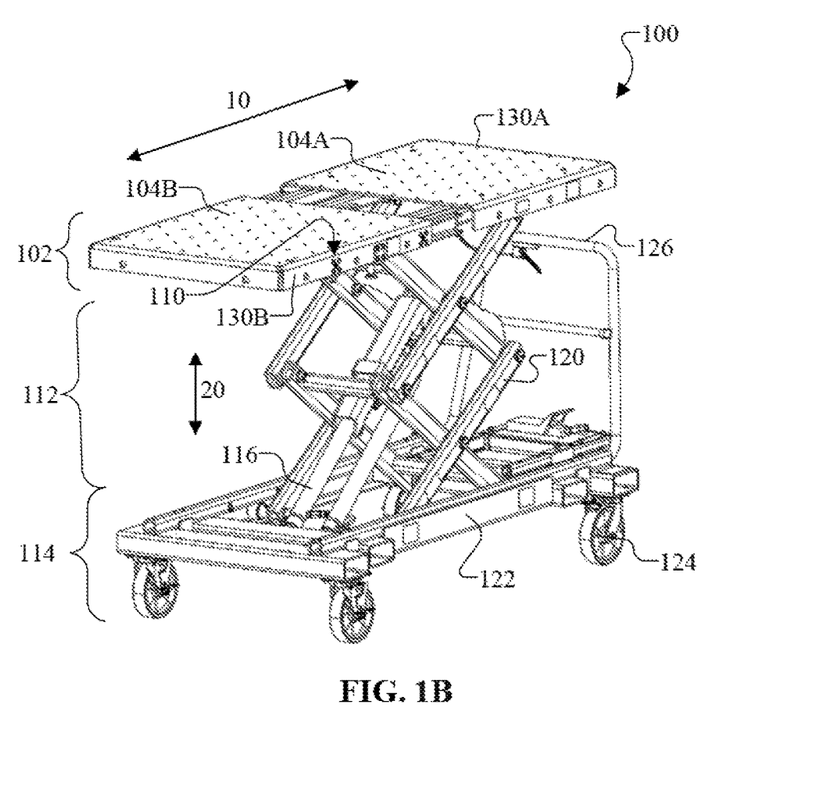
FIG. 1B is a perspective view of an example of the lift apparatus of FIG. 1A in which the platform is in a second state according to an example embodiment of this disclosure.

FIGS. 1A and 1B are perspective views of a lift apparatus 100 according to an example embodiment. The lift apparatus 100 includes a platform assembly 102, which includes at least a platform 104, a frame 106 (FIG. 2), a structural channel 108 (FIG. 2), and a platform extension mechanism 110. The platform assembly 102 is advantageously configured to provide a platform 104, which is extendible with horizontal slack adjustment. In addition, the lift apparatus 100 includes at least a support assembly 112, a base assembly 114, and an actuator 116. As a non-limiting example, the lift apparatus 100 is a propulsion system lift, which is configured to provide the platform 104 as a stable and extendible work surface for various components, such as an electric vehicle battery, an engine, a transaxle, a fuel tank, a suspension, a cradle, a chassis system component, a powertrain, any suitable object, or any combination thereof. In this case, the extendibility of the platform assembly 102 is advantageous when performing various tasks, such as the separation of automotive powertrain components and/or other work. However, the lift apparatus 100 is not limited to propulsion system lifts, but may apply to any system that is structured to include the platform assembly 102.

The platform assembly 102 is configured to provide various states, which include at least a first state (or "a closed state" as shown in FIG. 1A) and a second state (or "a fully extended state" as shown in FIG. 1B). In addition, the platform assembly 102 is configured to provide one or more intermediary states, which are between the first state and the second state. These various states enable the platform assembly 102 to provide different work surface arrangements that occupy different overall lengths along a longitudinal axis 10. More specifically, as shown in FIGS. 1A and 1B, the platform 104 is enabled to provide these states by being configured with a first portion 104A and a second portion 104B. In this example, the first portion 104A is fixed in place. Meanwhile, the second portion 104B is movable to different positions along the longitudinal axis 10.

When in the first state as shown in FIG. 1A, the first portion 104A and the second portion 104B are in contact and/or in closest proximity to each other compared to the second state or any intermediary state. To transition to this first state, the second portion 104B is moved towards (e.g., pushed towards) the first portion 104A such that these two portions are in contact with each other or include a relatively small gap between each other to prevent a pinching effect. In contrast, when in the second state, as shown in FIG. 1B, the first portion 104A and the second portion 104B are furthest away from each other along the longitudinal axis 10 compared to the first state or any other intermediary state. To transition to this second state, the second portion 104B is moved away (e.g., pulled out) from the first portion 104A such that these two portions are provided with a relatively large gap between each other to provide a split-table arrangement.

Upon obtaining the selected work surface configuration, the second portion 104B is configured to be locked at a selected position along the longitudinal axis 10 via a locking mechanism 118 that engages with the structural channel 108. As a non-limiting example, the locking mechanism 118 is a plunger pin (FIG. 2) with its locking knob advantageously located along a vertical axis 20 in an easily accessible and non-interfering position. In addition, the platform 104 is also movable along the vertical axis 20, which is perpendicular to the longitudinal axis 10. Advantageously, the platform 104 is structured to provide a work surface, which is adjustable to different lengths and different heights, thereby being suitable for various objects and/or tasks.

In addition, the platform assembly 102 includes one or more platform extension mechanisms 110 to provide stability to the platform 104. For example, in FIGS. 1A and 1B, the platform 104 includes a total of four platform extension mechanisms 110, which are disposed on the movable portion (e.g. second portion 104B) of the platform 104 to control or reduce the amount the slop and/or backlash along a lateral axis 30, for example, when the movable portion is moving toward or away from the fixed portion (e.g., first portion 104A) along the longitudinal axis 10. The second portion 104B includes a set of platform extension mechanisms 110 on one side of the platform 104 and another set of platform extension mechanisms 110 on an opposite side of the platform 104. Each of the platform extension mechanisms 110 of the first set is aligned with a corresponding one of the platform mechanisms 110 of the second set along the lateral axis 30 to combat a side-to-side movement of the platform assembly 102.

The support assembly 112 is structured to support the platform assembly 102 at various positions along the vertical axis 20. The support assembly 112 includes any suitable structure that is configured to provide this function. For example, in FIGS. 1A and 1B, the support assembly 112 includes a scissor lift assembly, which includes folding supports with legs 120 that are movable to different positions to support the platform 104 at different heights along the vertical axis 20. As a non-limiting example, for instance, the scissor lift assembly includes a first pair of crossed legs 120 and a second pair of crossed legs 120. The support assembly 112 includes a mounting structure (e.g., a set of flanges), which is structured to connect with one end of the actuator 116 that is configured to move the legs 120. The scissor lift assembly is configured to provide various states, such as a lowered state and a raised state, as well as intermediary states positioned between the lowered state and the raised state.

The base assembly 114 includes any suitable structure that provides support to the other components of the lift apparatus 100. For instance, as a non-limiting example, in FIGS. 1A and 1B, the base assembly 114 includes a frame structure 122. The frame structure 122 includes a mounting structure (e.g., a set of flanges), which is structured to connect with another end of the actuator 116. Also, in this example, the frame structure 122 includes wheels 124 (e.g., caster wheels) and a steering handle 126, which are advantageous in enabling the lift apparatus 100 to move to various locations with ease. As another example (not shown), the base assembly 114 is a stationary base or any suitable frame structure, which is configured to support the other components of the lift apparatus 100.

The actuator 116 is a hydraulic system, a pneumatic system, an electrical/electronic system, or any suitable actuation system that is enabled to provide the functions described herein. For example, in FIGS. 1A and 1B, the actuator 116 is a hydraulic cylinder, which has an end connected to the base assembly 114 and an opposite end connected to the support assembly 112. For instance, in FIGS. 1A and 1B, the hydraulic cylinder has a first mount at an end of its housing secured to the base assembly 114 and a second mount at an end of its piston rod secured to the leg 120 of the support assembly 112. This mounting of the hydraulic cylinder enables the hydraulic cylinder to be supported at one end of the housing while enabling a movement of the piston rod to drive the leg 120 to various positions to provide the platform 104 at various heights. The actuator 116 is configured to drive the support assembly 112 such that the platform 104 ascends or descends to the desired height with ease by an activation device, which may be any suitable simple machine. For example, in FIGS. 1A and 1B, the activation device is a pedal 128 (or lever), which is operably connected to the actuator 116 via a cable.

Figure 2:
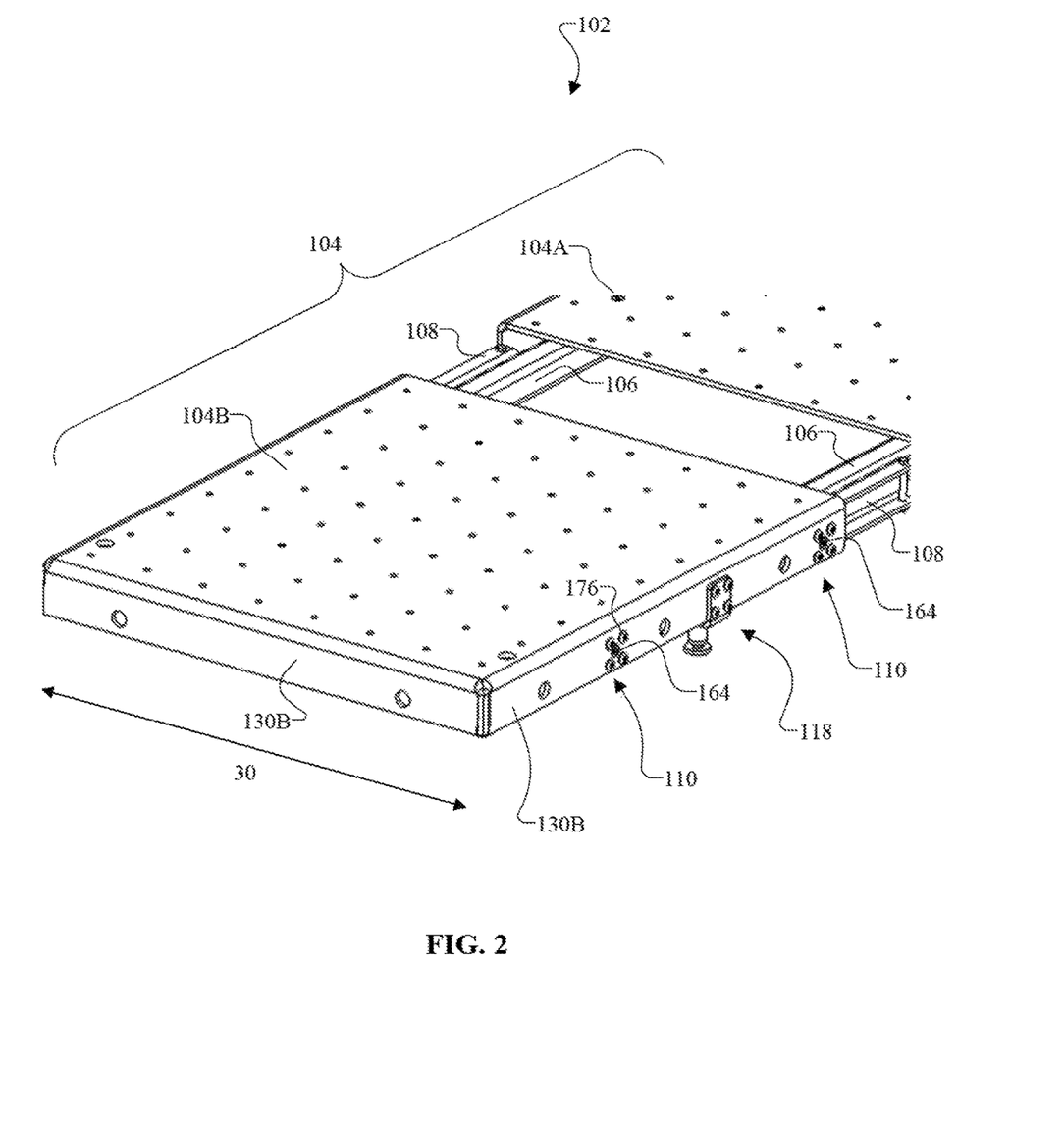
FIG. 2 is an enlarged and partial view of an example of a platform assembly according to an example embodiment of this disclosure.
Figure 3A:
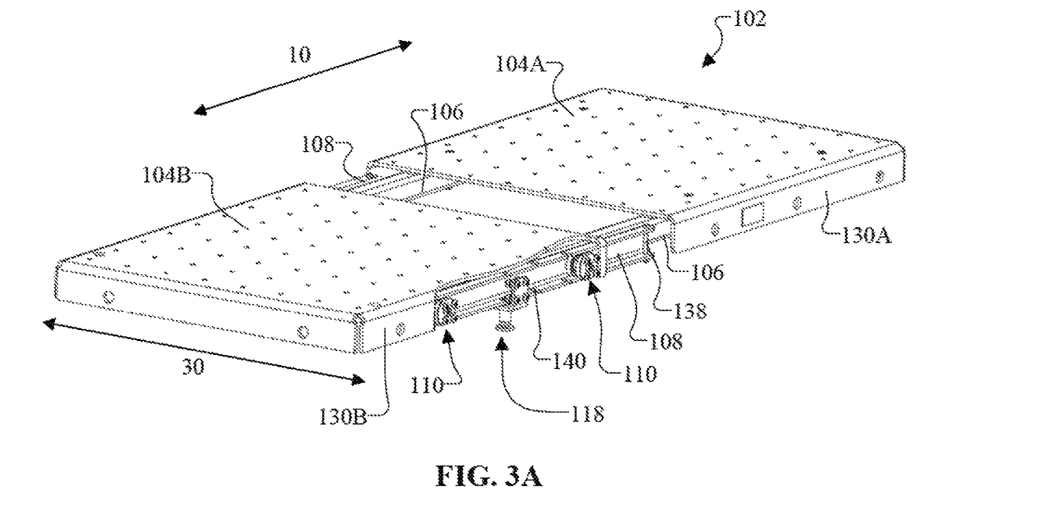
FIG. 3A is a cutaway view of a part of the platform assembly according to an example embodiment of this disclosure.
Figure 3B:
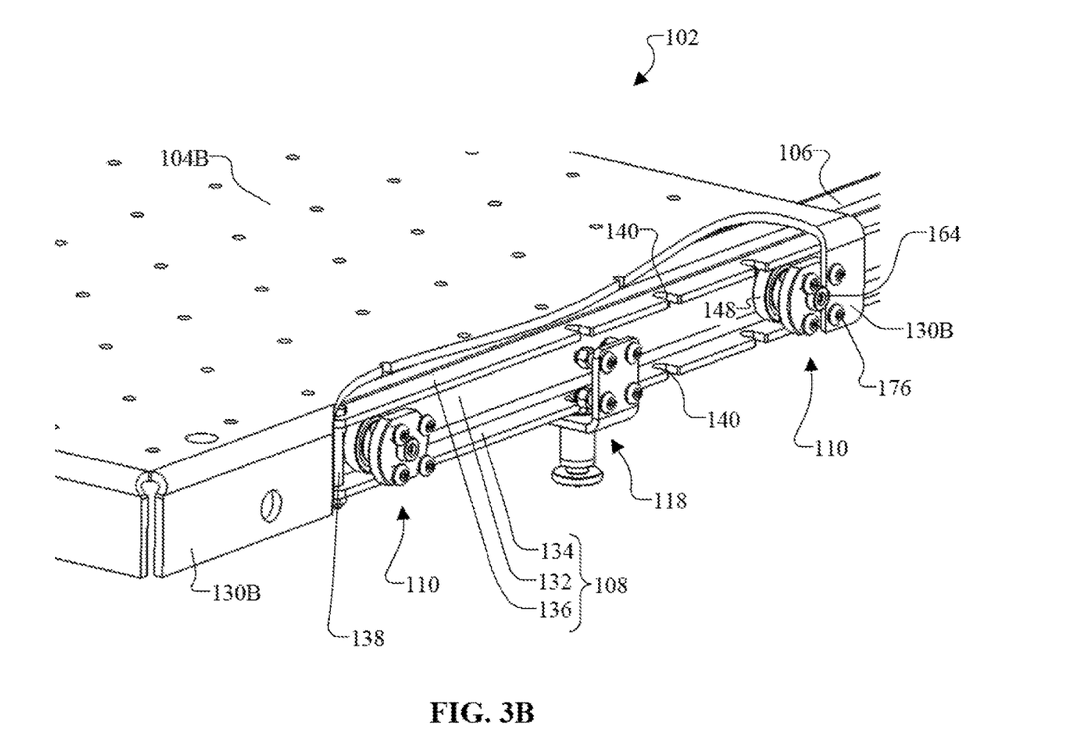
FIG. 3B is an enlarged view of the cutaway of FIG. 3A to reveal aspects of the platform extension mechanism according to an example embodiment of this disclosure.

FIGS. 2, 3A, and 3B show different views of a platform assembly 102 according to an example embodiment. More specifically, FIG. 2 shows an enlarged view of platform assembly 102 while FIGS. 3A-3B show cut-away views of the platform assembly 102. As aforementioned, the platform assembly 102 includes the platform 104 with a work surface, which includes at least an upper surface of the first portion 104A and an upper surface of the second portion 104B. In addition, the first portion 104A includes sidewall portions 130A, which include surfaces that extend perpendicular to the work surface and parallel to the vertical axis 20. In this non-limiting example, these sidewall portions 130A are on each side of the first portion 104A except on the side of the first portion 104A that faces the second portion 104B. The second portion 104B includes sidewall portions 130B, which include surfaces that extend perpendicular to the work surface. In this non-limiting example, the sidewall portions 130B are on each side of the second portion 104B except on the side of the second portion 104B that faces the first portion 104A. These sidewall portions 130A and 130B are advantageous in providing a portion of the platform 104 that one or more platform extension mechanisms 110 can be mounted which do not interfere with the work surface while also covering and protecting the platform extension mechanisms 110 from foreign matter and/or disturbances.

The frame 106 is configured to support the platform assembly 102 including the platform 104. For example, in FIGS. 2 and 3A-3B, the frame 106 comprises a rectangular shape. The frame 106 is a rigid structure, which comprises at least one metal or any suitable material. The frame 106 is configured to support the first portion 104A, which includes the work surface and the first sidewall portions 130A, and also the second portion 104B, which includes the work surface and the second sidewall portions 130B. In addition, the frame 106 is structured to support one or more structural channels 108. For example, in FIG. 2, the frame 106 supports a plurality of structural channels 108 including a first structural channel 108 on one side of the frame 106 and a second structural channel 108 on the opposite side of the frame 106.

The structural channel 108 includes a central wall 132, which is disposed between a first sidewall 134 and a second sidewall 136. For example, as shown in FIG. 3A, the structural channel 108 has its central wall 132 mounted and secured to a sidewall of the frame 106 such that the structural channel 108 is open at a side that faces away from the frame 106. The structural channel 108 is fixed to the frame 106. The structural channel 108 is structured to support one or more platform extension mechanisms 110. For example, in FIGS. 3A and 3B, each structural channel supports two platform extension mechanisms 110, which are spaced apart from each other in accordance with various considerations, such as load balancing, etc. In this regard, for example, each platform extension mechanism 110 is configured to move along the structural channel 108 by engaging with the first sidewall 134 and the second sidewall 136 at the same time to adjust a position of the second portion 104B while controlling and reducing any slop and backlash by engaging and abutting against the central wall 132.

The structural channel 108 is also structured to include at least one stopper 138. The stopper 138 is configured to establish a bound for the platform extension mechanism 110 such that the platform extension mechanism 110 does not move beyond that bound. For example, the structural channel 108 includes a first stopper 138 at a first end portion of the structural channel 108 and a second stopper 138 at a second end portion of the structural channel 108. The first stopper 138 prevents or stops the first platform extension mechanism 110 from moving beyond a first end portion of the structural channel 108. The second stopper 138 prevents or stops the second platform extension mechanism 110 from moving beyond a second end portion of the structural channel 108. In this regard, the stopper 138 includes a mechanical fastener (e.g., bolt, etc.) or any suitable device that obstructs a space between the first sidewall 134 and the second sidewall 136 such that the corresponding platform extension mechanism 110 is not able to pass or move beyond that part of the structural channel 108.

The platform assembly 102 includes the locking mechanism 118, which is configured to provide a locked state and unlocked state of the platform 104. The structural channel 108 is also structured to support the locking mechanism 118. For instance, in FIGS. 3A and 3B, the locking mechanism 118 is disposed between the first platform extension mechanism 110 and the second platform extension mechanism 110. Also, in this example, the structural channel 108 includes at least one set of notches 140 in which each notch 140 is configured to provide the locked state when engaged with the push pin of the locking mechanism 118. The structural channel 108 includes at least a first set of notches 140 on the first sidewall 134. Also, in at least FIGS. 2 and 3A-3B, the structural channel 108 includes a second set of notches 140 on a second sidewall 136. The second set of notches 140 mirror the first set of notches 140. By providing sets of notches 140 on both the first sidewall 134 and the second sidewall 136, the platform assembly 102 is configured to be assembled quickly and with ease as either the first sidewall 134 or the second sidewall 136 may be oriented as the upper/lower sidewall while also providing material savings and cost savings with respect to the structural channel 108 itself.

FIGS. 4A, 4B, 4C, and 4D illustrate various views of the platform extension mechanism 110 according to an example embodiment. The platform extension mechanism 110 is configured to enable the second portion 104B of the platform 104 to move with stability by controlling and reducing any slop and/or side-to-side backlash, which may occur, for example, when the second portion 104B is transitioning and/or moving from one position to another position along the longitudinal axis 10. In an example embodiment, as shown in at least the FIG. 4B, the platform extension mechanism 110 includes an axle 142, a bumper 144, an adjuster 146, and a rolling bearing 148. More specifically, the platform extension mechanism 110 is configured such that the axle 142 is structured to support the bumper 144, the rolling bearing 148, and the adjuster 146 at the same time with respect to the platform 104 and the structural channel 108.

Figure 5A:
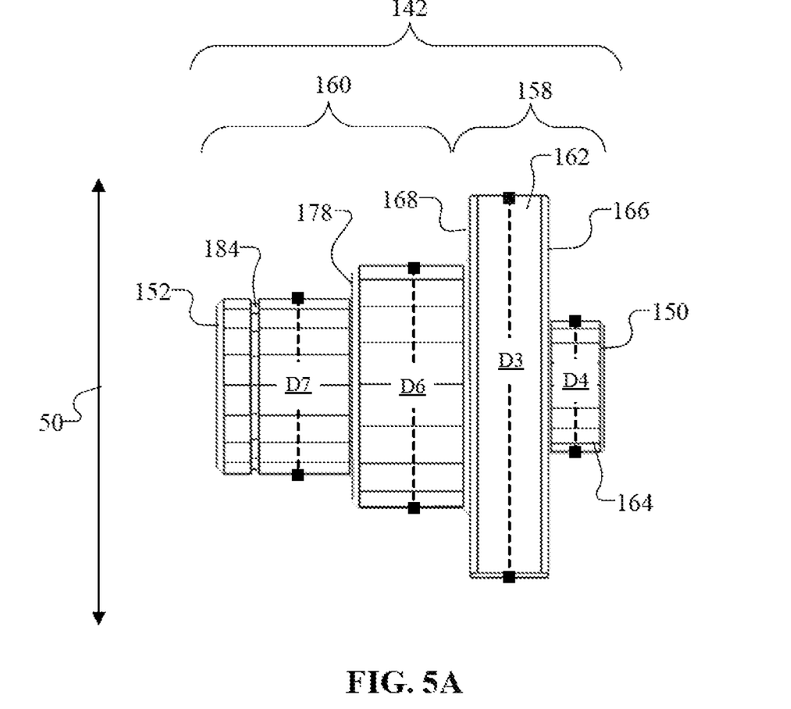
FIG. 5A is a view of a side of the axle according to an example embodiment of this disclosure.
Figure 5B:
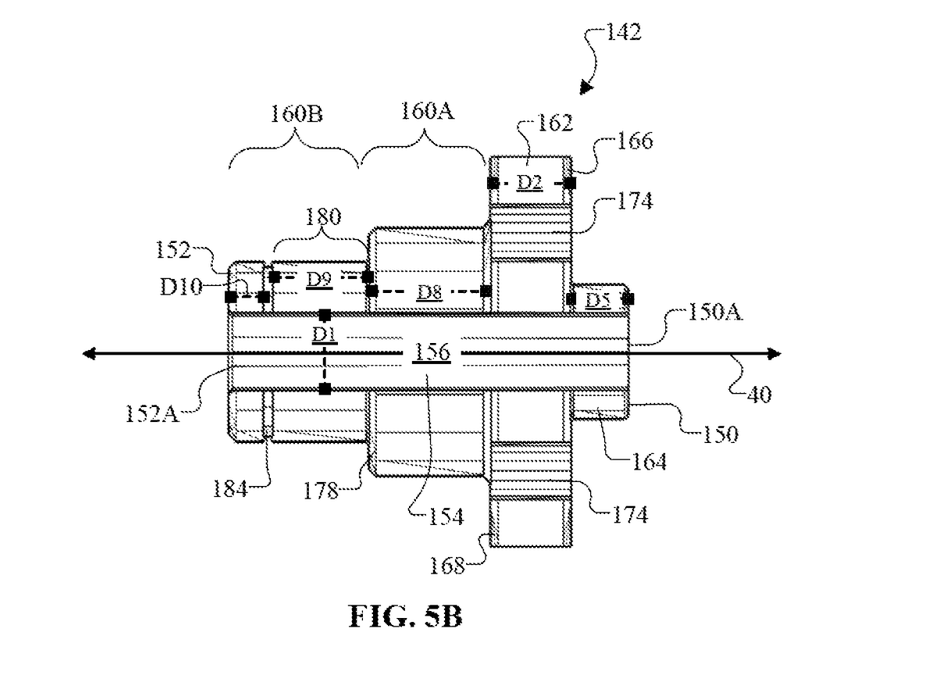
FIG. 5B is a view of a cross-section of the axle of FIG. 5A according to an example embodiment of this disclosure.

FIGS. 5A and 5B illustrate a side view and a cross-sectional view of the axle 142 according to an example embodiment. The axle 142 is an elongated member, which extends along a first axis 40 from its first end surface 150 to its second end surface 152. The axle 142 includes interior wall portions 154 that define a slot 156 from the first end surface 150 to the second end surface 152. The axle 142 is structured to provide access to the slot 156 via a first opening 150A defined at the first end surface 150 and a second opening 152A defined at the second end surface 152. Also, in the example shown in FIG. 5B, the interior wall portions 154 and/or the slot 156 have uniform dimensions D1 throughout the length of the axle 142 from the first end surface 150 to the second end surface 152. This uniformity of the interior wall portions 154 that define the slot 156 enables the bumper 144 and adjuster 146 to move to various positions along the axle 142 in a smooth manner as there are no step portions due to varied dimensions along these interior wall portions 154.

The axle 142 is structured to receive the bumper 144 and the adjuster 146 within the slot 156. In this regard, the axle 142 provides a sleeve structure that serves to house and protect the bumper 144 and adjuster 146. This feature is advantageous in protecting the bumper 144 while the bumper 144 is focused on confronting slop and/or backlash of the platform assembly 102. In addition, the axle 142 is structured to support the rolling bearing 148 while the bumper 144 and the adjuster 146 are housed within the slot 156. In this regard, the axle 142 comprises a strong, rigid material. As an example, the axle 142 comprises at least one metal. For example, in at least FIGS. 5A and 5B, the axle 142 comprises steel or any suitable material (e.g. metal or non-metal material) that is configured to provide the functions described herein. Further, as shown in FIGS. 5A and 5B, the axle 142 is symmetrical about the first axis 40.

The axle 142 is configured to move along the structural channel 108. More specifically, for example, as shown in at least FIG. 3B, the axle 142 is connected to the second portion 104B of the platform 104 and enabled to move that second portion 104B relative to the structural channel 108 so that the overall length of the platform 104 is adjustable. In this regard, the axle 142 is disposed between the structural channel 108 and the platform 104. With respect to the structural channel 108, the axle 142 is configured to reside within a channel space that is defined by the first sidewall 134, the second sidewall 136, and the central wall 132. More specifically, referring to FIG. 3B, as an example, the axle 142 is disposed within the channel such that the length of the axle 142 along the first axis 40 extends perpendicular to a length of the structural channel 108 along the longitudinal axis 10. In this regard, when installed, the axle 142 extends lengthwise along the first axis 40, which is parallel to or the same as the lateral axis 30. This arrangement enables the first end surface 150 to be accessible from the sidewall portion 130B of the platform 104. The axle 142 is therefore advantageous in providing a support structure, which enables the bumper 144 to be adjusted via the adjuster 146 from a lateral side of the platform 104. In addition, this arrangement enables the second end surface 152 to face a corresponding part of the central wall 132 of the structural channel 108 to provide stability to the platform assembly 102.

Figure 4A:
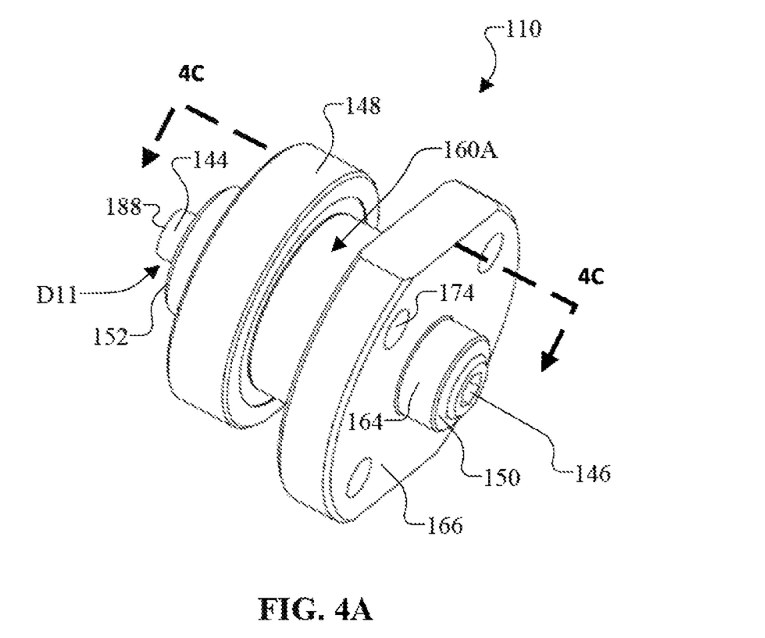
FIG. 4A is a perspective view of an example of the platform extension mechanism in an assembled state according to an example embodiment of this disclosure.
Figure 4B:
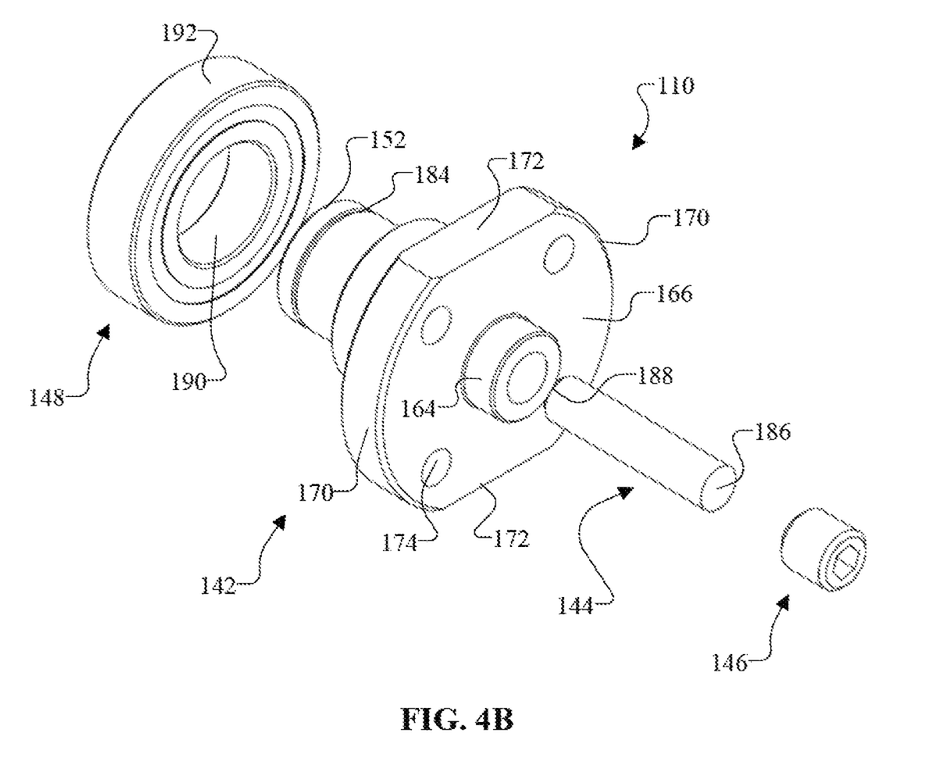
FIG. 4B is an exploded view of the platform extension mechanism of FIG. 4A according to an example embodiment of this disclosure.
Figure 4C:
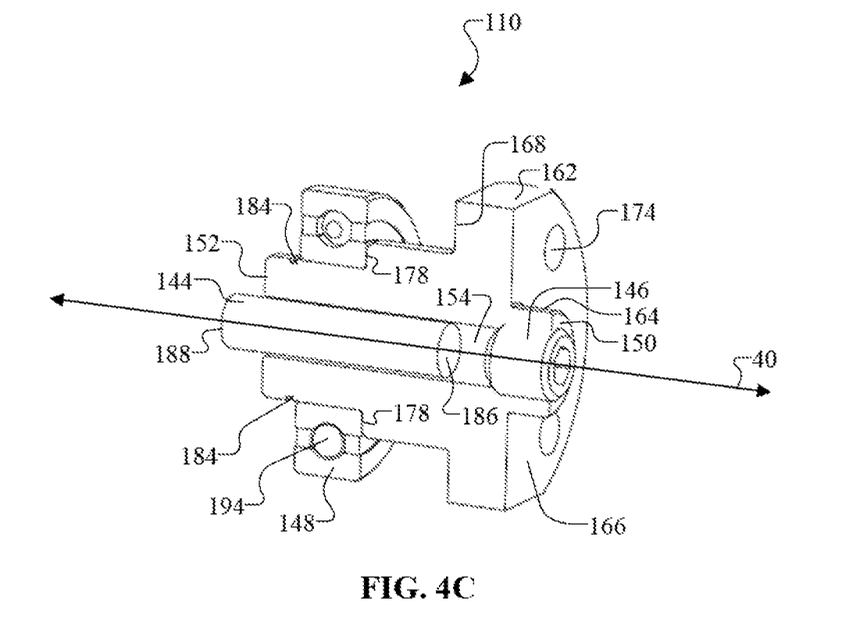
FIG. 4C is a cross-sectional view of the platform extension mechanism that is taken along line 4C-4C of FIG. 4A according to an example embodiment of this disclosure.

The axle 142 includes at least a mounting portion 158 and a shaft portion 160. The mounting portion 158 is mountable to the platform 104. The mounting portion 158 is structured to be in contact with a sidewall portion 130B of the platform 104. The mounting portion 158 includes a flange 162 and a boss 164. The flange 162 is spaced from the first end surface 150 of the axle 142 by a length (D5) of the boss 164. The flange 162 is an annular plate or plate-like structure, which has a periphery that extends beyond the periphery of the boss 164 and the periphery of the shaft portion 160. The flange 162 comprises a suitable thickness D2 to provide a strong foundation for its mounting function. With respect to a second axis 50 that extends perpendicular to the first axis 40, the axle 142 has a greatest dimension D3 at the flange 162 than at the other portions (e.g., shaft portion 160, boss 164, etc.) of the axle 142. As shown in FIGS. 5A and 5B, for instance, the flange 162 has the greatest outer periphery of the axle 142. Also, the flange 162 includes a first side and a second side. The first surface 166 is on the first side of the flange 162. The second surface 168 is on the second side of the flange 162. The flange 162 is structured to be any suitable shape that provides the functionalities described herein. For example, as shown in FIG. 4B, the mounting portion 158 includes curved portions 170 and flat portions 172, which are opposite to each other and structured to be parallel with the first sidewall 134 and the second sidewall 136 of the structural channel 108. The flat portions 172 are advantageous in ensuring that the axle 142 is oriented and installed in a proper manner, as shown in FIG. 3V. Moreover, in this case, these flat portions 172 ensure that the flange 162 does not interfere with the first sidewall 134 and the second sidewall 136 of the structural channel 108.

The mounting portion 158 includes an outer region and an inner region. The outer region includes the plate or plate-like structure with connecting mechanisms, which enable the flange 162 to be secured to an inner side of the sidewall portion 130B of the platform 104. For example, as shown in at least FIGS. 4D and 5B, the connecting mechanisms include through-holes 174 that are defined from the first surface 166 to the second surface 168 of the flange 162. The flange 162 is configured to receive mechanical fasteners 176 (FIG. 3B) via the through-holes 174. In this case, the flange 162 includes four through-holes 174 in a rectangular (e.g., square) configuration around the inner region to provide a secure and uniform connection between the flange 162 and the sidewall portion 130B via the mechanical fasteners 176. In this regard, the sidewall portion 130B also includes this same rectangular configuration of through-holes to receive these mechanical fasteners 176 for mounting the axle 142. For instance, in FIGS. 2, 3A, and 3B, the mechanical fasteners 176 are configured to secure the second portion 104B to the axle 142 such that the second portion 104B is enabled to move with the axle 142 along the structural channel 108. Meanwhile, the inner region includes the boss 164 and the slot 156.

The boss 164 comprises a first end portion of the axle 142. The boss 164 includes the first end surface 150 of the axle 142. The boss 164 protrudes outward from the first surface 166 at the first side of the flange 162. The boss 164 comprises a hollow structure to provide the slot 156. For example, the boss 164 is cylindrical or any suitable shape. In addition, the boss 164 is located at a center part of the inner region of the flange 162. The boss 164 is coaxial with other parts of the axle 142. With respect to the second axis 50 that extends perpendicular to the first axis 40, the axle 142 has a smallest dimension D4 at the boss 164 than at the other portions (e.g., shaft portion 160, flange 162, etc.) of the axle 142. For example, as shown in FIGS. 5A and 5B, the boss 164 provides the smallest outer periphery of the axle 142 compared to the other parts of the axle 142. In addition, the boss 164 is structured to connect to and mate with the sidewall portion 130B of the platform 104. For example, as shown in FIGS. 2 and 3A-3B, the boss 164 is structured to extend through a through-hole of the sidewall portion 130B of the platform 104. In this regard, the boss 164 has a dimension D5, which is about the same as a thickness of the sidewall portion 130B or greater than the thickness of the sidewall portion 130B such that the boss 164 is exposed and locatable from an exterior side of the sidewall portion 130B. The first end surface 150 of the boss 164 includes a first opening to the slot 156 of the axle 142. When the flange 162 is secured to the sidewall portion 130B of the platform 104, the boss 164 is structured to be flush and/or protrude slightly outward from the exterior side of the sidewall portion 130B. This feature enables a user to locate, access, and adjust the adjuster 146 of the bumper 144 via the boss 164 with ease in order to control and reduce the slop and/or backlash of the platform 104.

The shaft portion 160 comprises a second end portion of the axle 142. The shaft portion 160 includes the second end surface 152 of the axle 142. The shaft portion 160 protrudes outward from the second surface 168 at the second side of the flange 162. The shaft portion 160 comprises a hollow structure to provide the slot 156. In this regard, the shaft portion 160 is structured as a sleeve to house at least the bumper 144 and the adjuster 146. Also, the shaft portion 160 includes a first shaft section 160A and a second shaft section 160B, which include the interior wall portions 154 and the slot 156 along with structural distinctions as shown in at least FIG. 5B. The first shaft section 160A protrudes outward from the second surface 168 of the flange 162. The second shaft section 160B protrudes outward from a surface 178 of the first shaft section 160A such that the first shaft section 160A is between the flange 162 and the second shaft section 160B. The second shaft section 160B includes the second end surface 152 along with the second opening 152A to the slot 156 of the axle 142. When the flange 162 is secured to the sidewall portion 130B of the platform 104, the second end surface 152 along with the second opening 152A face a corresponding part of the central wall 132 of the structural channel 108. This feature is advantageous, as this enables the bumper 144 to protrude outward from the slot 156 at an adjustable amount via the adjuster 146 to engage with and confront the structural channel 108, thereby controlling and reducing the backlash of the platform 104.

The first shaft section 160A is disposed between the flange 162 and the second shaft section 160B. A dimension D6 of the first shaft section 160A is less than a dimension D3 of the flange 162 when taken along the second axis 50. In addition, the dimension D6 of the first shaft section 160A is greater than a dimension D7 of the second shaft section 160B when taken along the second axis 50. In this regard, the outer periphery of the first shaft section 160A extends further out along the second axis 50 from a center of the axle 142 than the outer periphery of the second shaft section 160B. The first shaft section 160A is larger than the second shaft section 160B along the second axis 50 to provide a strong connection between the mounting portion 158 and the second shaft section 160B. The difference between the extension of the first shaft section 160A and the extension of the second shaft section 160B along the second axis 50 forms a step-like structure with a transition that includes at least one surface 178 at that part of the first shaft section 160A that extends beyond the periphery of the second shaft section 160B along the second axis 50. This surface 178 is configured to provide a first shoulder for the rolling bearing 148 when the rolling bearing 148 is supported at a designated location 180 on the second shaft section 160B. The first shoulder is configured to retain the rolling bearing 148 at the designated location 180 on the rolling bearing 148 by providing the surface 178 as an abutment such that the rolling bearing 148 is obstructed from moving beyond that designated location 180 and prevented from moving towards the mounting portion 158. In this regard, the first shaft section 160A is configured to provide a predetermined distance D8 between the mounting portion 158 and the second shaft section 160B. This predetermined distance D8 provides sufficient spacing such that the mounting of the flange 162 to the sidewall portion 130B does not interfere with the rolling bearing 148 while providing proper placement of the rolling bearing 148 with respect to the structural channel 108.

The second shaft section 160B has an outer surface that is structured to support the rolling bearing 148. More specifically, the second shaft section 160B has the designated location 180 on its outer surface for positioning the rolling bearing 148 along the axle 142. The designated location 180 has a dimension D9, which is sized to accommodate the rolling bearing 148. The rolling bearing 148 is configured to rotate about the second shaft section 160B and/or a center axis of the second shaft section 160. The designated location 180 is provided to ensure that the rolling bearing 148 is positioned along the axle 142 such that the rolling bearing 148 is enabled to rotate relative to the first sidewall 134 and the second sidewall 136. In this regard, the second shaft section 160B is configured to house at least a portion of the bumper 144 within its portion of the slot 156 while simultaneously supporting the rolling bearing 148 at the designated location 180 about its outer surface or periphery.

Figure 4D:
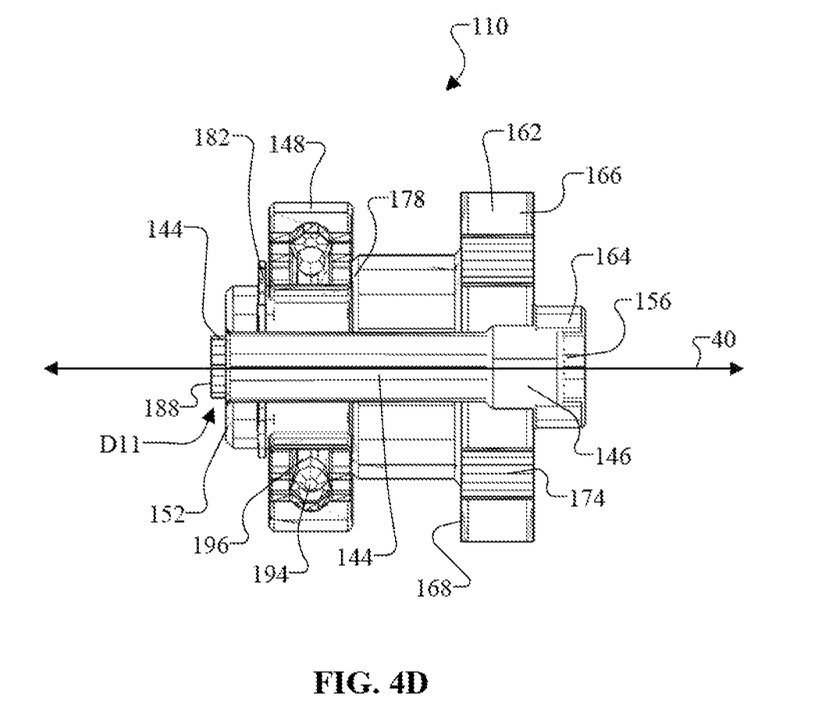
FIG. 4D is a side view of a cross-sectional view of the platform extension mechanism according to an example embodiment of this disclosure.

The designated location 180 is bounded by at least the first shoulder, as discussed above. Also, as shown in the example of FIG. 4D, the designated location 180 is further bounded by a second shoulder. The second shoulder is provided by any suitable mechanical device or structure. For example, in FIG. 4D, the second shoulder is provided by a retaining ring 182 or any suitable fastener. In this case, the second shaft section 160B includes a groove 184 on its outer surface to receive the retaining ring 182 about its outer surface. The groove 184 is spaced from the second end surface 152 by a predetermined distance D10 such that the rolling bearing 148 is configured to be spaced from the central wall 132 of the structural channel 108. The retaining ring 182 is advantageous in being able to retain the rolling bearing 148 at the designated location 180 along the axle 142, for example, while assembling the platform assembly 102. In addition, the retaining ring 182 is advantageous in serving as the second shoulder, thereby providing an abutment surface to retain the rolling bearing 148 at the designated location 180 and prevent the rolling bearing 148 from moving towards the second end surface 152 and/or the structural channel 108.

The bumper 144 is an elongated member, which includes a first surface 186 and a second surface 188. The first surface 186 and the second surface 188 are disposed at opposite end portions of the bumper 144. For example, as shown in at least FIGS. 4B-4D, the bumper 144 is a solid cylinder structure or any suitable shape that is configured to provide the functionalities described herein. The bumper 144 is sized to fit into and move within the slot 156 of the axle 142. In this regard, the dimension (e.g., diameter) of the bumper 144 along the second axis 50 is less than the dimension D1 of the interior wall portions 154 that define the slot 156. The length of the bumper 144 is less than the length of the axle 142. Also, the bumper 144 comprises any suitable material and/or composition that is enabled to provide the functionalities described herein. The bumper 144 is a relatively low friction pad. For instance, as a non-limiting example, the bumper 144 comprises plastic or any suitable material.

The bumper 144 is structured to move within the slot 156 and along the interior wall portions 154 of the axle 142. The bumper 144 is supported by the interior wall portions 154 of at least the shaft portion 160. The bumper 144 may also be supported by the interior wall portions 154 of the mounting portion 158. In this regard, the position of the bumper 144 within the slot 156 and along a length of the axle 142 is adjustable by the adjuster 146. For example, as shown in at least FIG. 4D, the first surface 186 of the bumper 144 is configured to contact and engage with the adjuster 146. To confront backlash, the bumper 144 is adjustable to a position along the axle 142 such that at least its second surface 188 is exposed via the second opening 152A of the slot 156 at the second end surface 152 of the axle 142. In addition, the bumper 144 is adjustable via the adjuster 146 such that a part of the bumper 144 protrudes outward from the second end surface 152 of the axle 142. The amount D11 (FIGS. 4A and 4D) that the bumper 144 protrudes outward along the first axis 40 from the second end surface 152 is adjustable in accordance with the amount of backlash (and/or the amount of binding) that is being addressed while being bounded by the amount of space between the second end surface 152 of the axle 142 and the central wall of the structural channel 108. Advantageously, the bumper 144 is configured to interact with and confront a corresponding part of the central wall 132 of the structural channel 108, thereby combatting backlash and/or absorbing impact at least along the lateral axis 30.

The adjuster 146 is operable to adjust a positon of the bumper 144 within the slot 156 of the axle 142. The adjuster 146 is advantageously positioned to be accessible, via an opening of the slot 156, at the first end surface 150 of the boss 164. For example, in FIG. 4D, the adjuster 146 is movable along the slot 156 at portions corresponding to at least the boss 164 and the flange 162. The adjuster 146 may also move along the slot 156 at portions corresponding to the shaft portion 160. Also, as a non-limiting example, the adjuster 146 is an adjusting screw or any suitable mechanical device that is configured to provide the functions described herein.

The adjuster 146 is supported by the interior wall portions 154 that define the slot 156. In addition, the adjuster 146 is aligned with the bumper 144 along the first axis 40 of the axle 142. In this regard, in FIG. 4D, the length of the adjuster 146 is less than the length of the axle 142. Also, referring to FIG. 4D, as a non-limiting example, the length of the adjuster 146 is less than the length of the bumper 144. When positioned within the slot 156, the adjuster 146 is configured to be coaxial with the axle 142. An end portion of the adjuster 146 is configured to engage with and or be in in contact with an end portion of the bumper 144. More specifically, the adjuster 146 is configured to move (e.g., push or pull) the bumper 144 linearly along the slot 156 in the same direction of travel that the adjuster 146 moves. For example, if the adjuster 146 moves towards the second end surface 152 of the axle 142 and/or towards the structural channel 108, then the adjuster 146 is configured to move the bumper 144 towards the second end surface 152 of the axle 142 and/or towards the structural channel 108. Alternatively, if the adjuster 146 moves towards the first end surface 150 of the axle 142 and/or away from the structural channel 108, then the adjuster 146 is configured to move the bumper 144 towards the first end surface 150 of the axle 142 and/or away from the structural channel 108.

The rolling bearing 148 includes any suitable type of machine element or mechanical device that provides the functionalities described herein. The rolling bearing 148 includes at least an inner ring 190, an outer ring 192, rolling elements 194, and a cage 196 for the rolling elements. The inner ring 190 is configured to receive the second shaft section 160B, thereby enabling the rolling bearing 148 to be concentric and/or coaxial with the axle 142. The second shaft section 160B is configured to support an inner ring 190 of the rolling bearing 148 about its outer surface such that the outer ring 192 is configured to rotate about the first axis 40 of the axle 142. The rotation of the outer ring 192 against the first sidewall 134 and the second sidewall 136 enables the rolling bearing 148 to move the axle 142 to various positions along the length of the structural channel 108. This movement of the axle 142 via the rolling bearing 148 enables the platform 104 to move along the structural channel 108 while reducing friction between moving parts.

As described above, the embodiments include a number of advantageous features, as well as benefits. For example, the platform extension mechanism 110 enables the platform assembly 102 to transition to different configurations along the longitudinal axis 10 in a smooth manner without excessive slack along the lateral axis 30. The platform assembly 102 is also configured to support at least one object of significant weight in a stable manner while the platform assembly 102 is transitioning to a different configuration. The platform extension mechanism 110 is advantageously structured to be mounted such that the axle 142 is protected and not exposed on an exterior portion of the platform 104. The platform extension mechanism 110 is easy to assemble and install on the platform assembly 102. In addition, the platform extension mechanism 110 is adjustable from an exterior portion of the sidewall portion 130B of the platform 104, thereby providing direct access and adjustment of the platform extension mechanism 110 at any time to control side-to-side backlash. In this regard, the ability to adjust and control this slop via the platform extension mechanism 110 overcomes the inconvenient and tedious manner of going underneath a platform to take out the play in components to reduce side-to-side backlash. The platform extension mechanism 110 is also adjustable to overcome various issues relating to binding and seizing.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A platform extension mechanism for a platform with a structural channel, the platform extension mechanism comprising:
   a bumper configured to confront a surface of the structural channel;
   a rolling bearing configured to move along the structural channel; and
   an axle having a first end surface and a second end surface, the axle being elongated along a first axis, the axle including interior wall portions that define a slot from the first end surface to the second end surface, the axle being structured to receive the bumper in the slot and support the bumper in relation to the platform and the structural channel, the axle including:
      a mounting portion having a flange with a first side and a second side, the first side of the flange being mountable to an inner side of a sidewall portion of the platform; and
      a shaft portion protruding outward from the second side of the flange, the shaft portion having a peripheral portion that is structured to support the rolling bearing at a designated location along the first axis and enable the rolling bearing to move along the structural channel,
   wherein,
      the shaft portion is structured to support the bumper and the rolling bearing in a coaxial arrangement.

2. The platform extension mechanism of claim 1, wherein:
   a dimension of the axle along the first axis is greater than a dimension of the bumper along the first axis; and
   the axle is structured to support the bumper such that the bumper protrudes outward from the second end surface of the axle.

3. The platform extension mechanism of claim 1, wherein:
   the axle comprises metal; and
   the bumper is an elongated member that comprises plastic.

4. The platform extension mechanism of claim 1, further comprising:
   an adjuster configured to adjust a position of the bumper along the first axis of the axle,
   wherein,
      the axle is configured to receive the adjuster via the slot and support the adjuster via the interior wall portions such that the adjuster is aligned with the bumper.

5. The platform extension mechanism of claim 4, wherein:
   the axle includes a boss that protrudes outward from the first side of the flange and along the first axis;
   the boss includes the first end surface with an opening to the slot; and
   the adjuster is accessible via the boss from an outer side of the sidewall portion of the platform when the flange is mounted to the inner side of the sidewall portion of the platform.

6. The platform extension mechanism of claim 1, wherein:
   the shaft portion includes a first shaft section and a second shaft section;
   the first shaft section protrudes outward from the second side of the flange;
   the second shaft section protrudes outward from the first shaft section such that the first shaft section extends between the flange and the second shaft section;
   the designated location is located along an outer surface of the second shaft section; and
   a dimension of the first shaft section along a second axis is greater than a dimension of the second shaft section along the second axis, the second axis being perpendicular to the first axis.

7. The platform extension mechanism of claim 6, wherein:
   the first shaft section is structured to establish a predetermined distance between the flange and the designated location for the rolling bearing;
   the shaft portion includes a first shoulder that is provided at a transition between the first shaft section and the second shaft section, the first shoulder being configured to retain the rolling bearing at the designated location along the axle; and
   the second shaft section includes a groove configured to receive a fastener that provides a second shoulder to retain the rolling bearing at the designated location along the axle.

8. A platform assembly comprising:
   a platform including at least a work surface portion and a sidewall portion;
   a frame configured to support the work surface portion and the sidewall portion;
   a structural channel mounted on the frame;
   a platform extension mechanism including
      a bumper configured to confront a surface of the structural channel;
      a rolling bearing configured to move along the structural channel; and
      an axle having a first end surface and a second end surface, the axle being elongated along a first axis, the axle including interior wall portions that define a slot from the first end surface to the second end surface, the axle being structured to receive the bumper in the slot and support the bumper in relation to the platform and the structural channel, the axle including:
         a mounting portion having a flange with a first side and a second side, the first side of the flange being mountable to the sidewall portion of the platform; and
         a shaft portion protruding outward from the second side of the flange, the shaft portion having a peripheral portion that is structured to support the rolling bearing at a designated location along the first axis and enable the rolling bearing to move along the structural channel,
   wherein the shaft portion is structured to support the bumper and the rolling bearing in a coaxial arrangement.

9. The platform assembly of claim 8, wherein:
a dimension of the axle along the first axis is greater than a dimension of the bumper along the first axis; and
the axle is structured to support the bumper such that the bumper protrudes outward from the second end surface of the axle.

10. The platform assembly of claim 8, wherein:
the axle comprises metal; and
the bumper is an elongated member that comprises plastic.

11. The platform assembly of claim 8, further comprising:
an adjuster configured to adjust a position of the bumper along the first axis of the axle,
wherein,
the axle is configured to receive the adjuster via the slot and support the adjuster via the interior wall portions such that the adjuster is aligned with the bumper.

12. The platform assembly of claim 11, wherein:
the axle includes a boss that protrudes outward from the first side of the flange and along the first axis;
the boss includes the first end surface with an opening to the slot;
the boss is structured to mate with a through-hole of the sidewall portion of the platform; and
the adjuster is accessible via the boss from an outer side of the sidewall portion of the platform when the flange is mounted to an inner side of the sidewall portion of the platform.

13. The platform assembly of claim 8, wherein:
the shaft portion includes a first shaft section and a second shaft section;
the first shaft section protrudes outward from the second side of the flange;
the second shaft section protrudes outward from the first shaft section such that the first shaft section extends between the flange and the second shaft section;
the designated location is located along an outer surface of the second shaft section; and
a dimension of the first shaft section along a second axis is greater than a dimension of the second shaft section along the second axis, the second axis being perpendicular to the first axis.

14. The platform assembly of claim 13, wherein:
the first shaft section is structured to establish a predetermined distance between the flange and the designated location for the rolling bearing;
the shaft portion includes a first shoulder that is provided at a transition between the first shaft section and the second shaft section, the first shoulder being configured to retain the rolling bearing at the designated location along the axle; and
the second shaft section includes a groove configured to receive a fastener that provides a second shoulder to retain the rolling bearing at the designated location along the axle.

15. A platform assembly comprising:
a platform including at least a work surface portion and a sidewall portion;
a frame configured to support the work surface portion and the sidewall portion;
a structural channel mounted on the frame; and
a platform extension mechanism including:
a bumper configured to confront a surface of the structural channel;
an adjuster configured to adjust a position of the bumper; and
an axle having a first end surface and a second end surface, the axle being elongated along a first axis, the axle including interior wall portions that define a slot from the first end surface to the second end surface, the axle including:
a mounting portion including a flange having a first side and a second side, the first side of the flange being mountable to the sidewall portion of the platform; and
a shaft portion protruding outward from the second side of the flange and supporting the bumper via the interior wall portions such that the bumper protrudes outward from the second end surface of the axle.

16. The platform assembly of claim 15, wherein:
the axle comprises metal; and
the bumper is an elongated member that comprises plastic.

17. The platform assembly of claim 15, wherein:
the axle includes a boss that protrudes outward from the first side of the flange and along the first axis;
the boss includes the first end surface with an opening to the slot;
the boss is structured to mate with a through-hole of the sidewall portion of the platform; and
the adjuster is accessible via the boss from an outer side of the sidewall portion of the platform when the flange is mounted to an inner side of the sidewall portion of the platform.

18. The platform assembly of claim 15, further comprising:
a rolling bearing to move along the structural channel,
wherein:
the shaft portion has a peripheral portion that is structured to support the rolling bearing at a designated location along the first axis and enable the rolling bearing to move along the structural channel; and
the shaft portion supports the rolling bearing and the bumper in a coaxial arrangement.

19. The platform assembly of claim 18, wherein:
the shaft portion includes a first shaft section and a second shaft section;
the first shaft section protrudes outward from the second side of the flange;
the second shaft section protrudes outward from the first shaft section such that the first shaft section extends between the flange and the second shaft section;
the designated location is located along an outer surface of the second shaft section; and
a dimension of the first shaft section along a second axis is greater than a dimension of the second shaft section along the second axis, the second axis being perpendicular to the first axis.

20. The platform assembly of claim 19, wherein:
the first shaft section is structured to establish a predetermined distance between the flange and the designated location for the rolling bearing;
the shaft portion includes a first shoulder that is provided at a transition between the first shaft section and the second shaft section, the first shoulder being configured to retain the rolling bearing at the designated location along the axle; and
the second shaft section includes a groove configured to receive a fastener that provides a second shoulder to retain the rolling bearing at the designated location along the axle.

* * * * *